No. 655,042. Patented July 31, 1900.
L. T. ALTON.
INCANDESCENT GAS BURNER.
(Application filed Aug. 5, 1897.)
(No Model.)
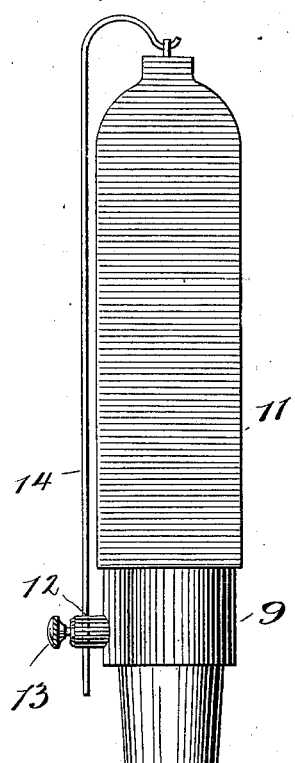
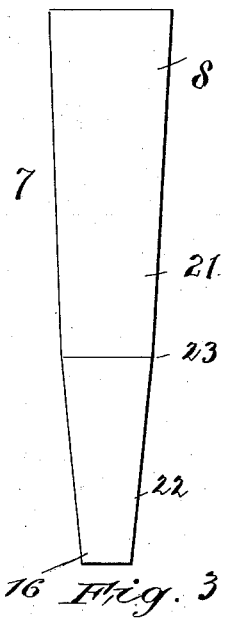
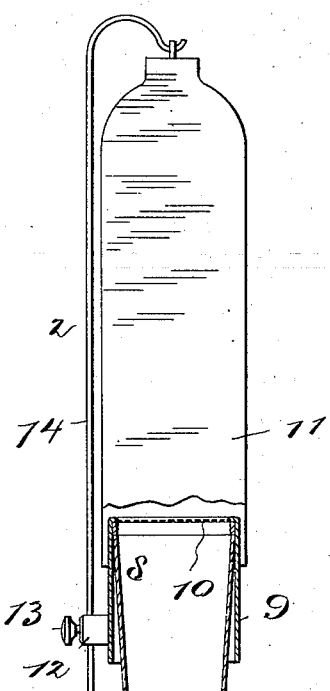
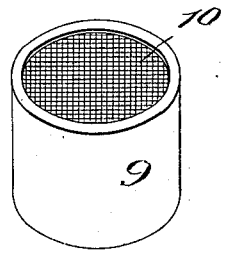
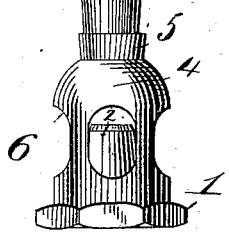
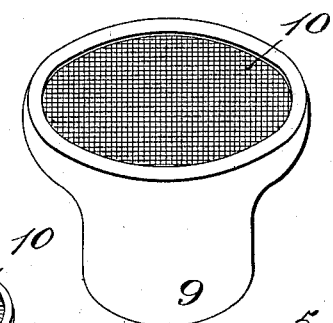
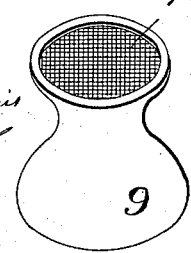
Witnesses,
Inventor
Lee T Alton
by Joseph L. Levy
atty

UNITED STATES PATENT OFFICE.

LEE T. ALTON, OF NEW YORK, N. Y.

INCANDESCENT GAS-BURNER.

SPECIFICATION forming part of Letters Patent No. 655,042, dated July 31, 1900.

Application filed August 5, 1897. Serial No. 647,145. (No model.)

*To all whom it may concern:*

Be it known that I, LEE T. ALTON, a citizen of the United States, residing at New York, (Brooklyn,) in the county of Kings and State of New York, have made certain new and useful Improvements in Incandescent Burners, of which the following is a specification.

My invention has reference to improvements in incandescent gas-burners of the kind which are generally known in the art as the "Welsbach" class, in which it is the object to raise the refractory mantle or hood employed in that class of burners to a degree of high incandescence. My improvements in this regard have for their object generally to perfect and simplify this general class of burners, and specifically to improve upon the burner shown and described in a patent to O. Kern, dated January 5, 1897, No. 574,805. In that patent a so-called "self-burning" mixture of air and gas is produced and impelled toward the combustion-point of the burner by the employment of a complex tube embodying what is termed in that patent a "mixing-cone" and a "suction-cone," these parts being produced by connecting two hollow cone frusta, so that said tube between its extremities is contracted, the contraction retarding the passage of the so-called "self-burning mixture" through the tube, accomplishing, as is alleged in said patent, an intimate commingling of the air and gas, the gradual expansion of the tube above the contracted portion acting simultaneously to relieve the resistance of the mixture in the part of the tube below the contraction and produce an induced current to increase the speed of passage of the volume of mixture to the combustion-point, thereby increasing the intensity of the light.

My present improvements have for their object to dispense with a compound or complex tube of the character described and eliminate from a feeding-tube the contraction recited in said patent and supply the mixture of air and gas, whether self-burning or not, to the combustion-point of the burner through a tube formed in the shape of an inverted cone smaller in diameter at the point of ingress of the mixture and of a gradually-increasing diameter to the point of exit of the mixture therefrom.

In the construction shown in the patent before described the contraction of the volume of mixture is made after the same has traversed at least one-third of the length of the feeding tube or pipe.

According to my improvements among other things the contraction or, in other words, the greatest resistance to the passage of the volume is had at the point of entry into the tube, where a retarding-shoulder is formed, and the release of the pressure is had gradually through the entire length of the tube until such volume reaches the exit thereof, the shoulder causing an initial rotation of the gas and air prior to its entrance into the tube, thus instituting at the point of entrance to the tube a partial or complete intermixture of air and gas. In this way the passage of the mixture is not retarded, but is continuous, and the gradual release of pressure as the column of mixture moves toward the exit of the tube not only thoroughly and intimately commingles the mixture of air and gas, but increases the speed of the passage of the same, thereby immensely increasing the combustion of the same.

My invention also contemplates the employment of a tube formed of two-cone frusta, one superposed above the other, the frustum of the superposed cone connecting the base of the lower cone, the frustum of the lower cone being the point of smallest diameter and the base of the superposed cone of greatest diameter, the tube being of a continuously-increasing diameter throughout.

My invention further comprehends the construction and combination of parts hereinafter described, and further pointed out in the claims.

In the drawings forming part of this specification, Figure 1 is a side elevation of my preferred construction of tube and burner. Fig. 2 is a sectional elevation thereof. Fig. 3 is a side elevation of a modified form of tube; Fig. 4, a perspective view of the perforated burner-tip shown in Fig. 1, and Figs. 5 and 6 respectively show like views of burner-tips modified in accordance with my present improvements.

Similar characters of reference indicate corresponding parts throughout the several views.

Referring now particularly to Fig. 1, there is shown a burner of the Bunsen type, but modified in accordance with my invention in one particular respect. There is the ordinary gas-inlet 1, with its nozzle 2, provided with a surmounting wall 3, having perforations therein, the nozzle projecting upwardly into a dome-like receiver 4, secured to the inlet, the upper end of the dome being provided with an annular nipple 5, and adjacent the openings in the nozzle the dome is provided with air-ports 6, rising above the perforations in the nozzle. The dome, it will be noticed, converges toward the annular nipple 5 and is curved at the top. The dome, nozzle, and air-ports form the initial receiver and mixer hereinafter referred to. This form of dome may be altered or modified, as conditions demand, without departing from the spirit of my invention.

At 7 is the feed-pipe, consisting of a conical hollow tube, formed of a cone frustum continuously tubular throughout and of gradually-increasing diameter from the inlet, which is at the nipple 5, into which the smallest end of the tube is placed and there secured in any desired manner, the lower edge $a$ of the tube forming a shoulder to the exit at 8, where the tube is of the greatest diameter. This tube supports a burner-tip comprising an annular ring 9, fitting over the end 8 of the tube, the opening in the top of the cap being intercepted by a perforated disk, which may be either in the form of a piece of wire-netting 10, secured in the opening of the cap, or otherwise formed in any desirable way, the cap forming the burner-tip for the burner. This tip, although it fits the tube-top snugly, can be adjusted up and down to present the incandescent zone to the mantle or hood at the desired point.

A refractory hood or mantle 11 of any well-known type is supported over the burner-tip in any desired manner, which may be as illustrated in the drawings, in which the cap 9 is provided with an outwardly-extending stud 12 and set-screw 13, supporting an upwardly-extending hooked rod 14, which in its turn supports the refractory hood or mantle 11, the end or lower opening of the mantle embracing the burner-tip, so that the perforated portion thereof lies well within the hood.

The foregoing description of parts accessory to my improved feed-tubes is had for the purpose of enabling the employment of the tubes to be the better understood.

The function of the tube is to act as draft-accelerator and also as a mixer for the column of mixed air and gas. This commingling is accomplished by causing the gas to pass through the perforations in the top of the nozzle 1, passing upwardly into the dome 4, carrying with it sufficient quantity of the air of the adjacent atmosphere which strikes the shoulder $a$ and enters the ingress portion of the tube through the air-ports 6 in the dome 4 above the egress of the gas from the nozzle, the quality of the mixture as regards its self-burning capacity being determined by the relative size of the opening in the nozzle for the gas to the dimensions of the air-ports in the dome. This mixture of air and gas, whether self-burning or not, passes, after striking the shoulder, from the dome into the lower or contracted portion of the tube 7 and in passing upwardly into the constantly-enlarging portions of the pipe becomes released of the pressure which it exerts upon the inner walls of the tube, and this release of pressure not only accelerates the movements of the column of mixture, but in a measure intimately commingles the gas and air together until it reaches the burner-tip. I prefer that the tube should be about three inches in length, about one-fourth of an inch in diameter inside at the bottom, and about seven-eighths of an inch at the top, but do not limit myself to this length. Of course it must be understood that these dimensions can be varied more or less without materially affecting the results. When tubes of these general or approximate dimensions are employed, I have found that a peculiar action results from inserting the end of the tube inside the nipple, as in Fig. 2.

The gas and air in passing into the tube is caused to strike the annular edge $a$, which deflects it and causes it to rotate and follow the line of the tube and produce a strong flue action, the column gradually expanding and increasing in speed as it approaches the exit. This deflection of the column allows of the employment of short tubes and prevents the column of gas and air passing up through the tube in a straight line without contacting with the walls, so that when the tube is under, say, five or six inches in length I prefer the relationship of parts as described.

Instead of employing the form of tube illustrated in Fig. 1 and in order to more intimately commingle the elements of the mixture I can employ the form of tube illustrated in Fig. 3, it being understood that the form illustrated in Figs. 1 and 2 is the primary form.

In Fig. 2 is illustrated a further form of tube comprising two cone frusta 21 22. The distinguishing feature of this pipe, Fig. 3, is that it is formed to present two cone frusta 21 22, the base of the smallest diameter of the frustum 21 being joined with the base of largest diameter of the frustum 22 at a point intermediate of the extremes 8 16 of the tube, as before described, this point of connection being had at 23 and preferably nearer to the smallest end 16 of the tube than to the largest end 8. This tube presents to the column of air and gas two inclined surfaces, the first more rapid than the second. In its movement from the point 16 to the point 8 the first surface converges sharply outwardly and the second from the point 23 gradually outward, both sections being of gradually-increased diameter. The function of this form of tube is to produce initially a very rapid action and to then check this rapid motion, causing an intimate commingling of the gas and air without decreasing the speed of delivery to the burner. As before stated, the air-ports allow of ingress of air from the surrounding atmosphere into the dome above the point where the gas passes from the nozzle into the dome, the air being drawn in as by an induced current caused by the passage of the gas, the mixing of the gas and air commencing at their point of union in the dome and being continued upwardly in the various manners previously described. This relationship between the dome, air-ports, and nozzle I consider of great importance.

The flame produced by my construction is in the shape of a hyperincandescent zone having a reddish-blue tint and rises about three to six inches above the burner-tip, according to the length of tube, as above set forth, the zone being of greater amplitude than that found in any other incandescent gas-burner to my knowledge prior to my invention.

The cap 9 fits the upper portion of the tube with sufficient friction to remain in position under the stress of its own weight and its appurtenances, while at the same time the cap can be moved up and down on the top, so as to locate the light-zone at any point desirable at the top of the tube or to bring it into actual or superficial contact with any desired portion of the refractory hood or mantle, which latter adjustment can be accomplished within certain limits by moving the supporting-rod up and down in the securing-stud 12.

The burner-tip may be as indicated in Figs. 1, 2, and 4, wherein the area of perforations is about equal to the largest interior diameter of the tube; but in order to produce a zone of greater diameter, and consequently increase the volume of incandescent surfaces, I can form the burner-tip as illustrated in Fig. 5, wherein the upper portion of the cap is flared outwardly, as shown, and the perforated diaphragm 10 secured in the top thereof. In this form the zone will exceed that of the largest diameter of the tube. If it is desired to employ the reverse form, that shown in Fig. 6 may be used, wherein the upper portion of the cap is spun in or otherwise conformed to reduce its diameter, as shown, and the perforated diaphragm secured in the top, thus providing a light-zone controller of smaller diameter than the largest diameter of the tube, decreasing the area of the incandescent-light zone, but increasing the intensity of the light.

Thus it will be seen that my invention comprises four distinct features: first, the improvement in the means employed for admitting air into the feed-tube, which embraces the feature of creating through the medium of the gas an induced current drawing in the air from the surrounding atmosphere into an initial mixing-chamber, the air entering into said mixing-chamber above the point of entry of the gas; secondly, the tube of gradually and constantly increasing diameter from its point of smallest diameter, which is in immediate connection with the primary gas-mixer, to its point of greatest diameter, which is in immediate connection with the burner-tip, either when the said tube is formed with straight sides diverging from the point of smallest diameter or, as in Fig. 3, where the two cone frusta are employed, the essential feature being that a tube of gradual and constantly increasing diameter is preserved throughout; thirdly, a burner-tip comprising, preferably, in part, a perforated diaphragm intercepting the flow of gas and air, and, fourthly, the intercepting-shoulder a. I therefore do not limit myself to the exact constructions hereinbefore described, as it is apparent that my invention can be otherwise embodied without departing from the spirit of the same; neither do I limit myself to producing the tubes and other parts of metal, as it or they may be made of porcelain or like material.

Having described my invention, I claim—

1. An improved burner for the purposes herein described, comprising a gas-inlet adapted to be detachably secured to a suitable fixture and having an upwardly-extending nozzle terminating in a crown having a multiplicity of apertures, and an initial gas and air mixing chamber secured to the exterior of the gas-inlet the upper portion of which is laterally contracted immediately above said apertured crown, an annular flange of less diameter than and surmounting said chamber, said flange being formed integral with said chamber, a conical tube, a burner-tip surmounting said conical tube, the lower and smaller end of said conical tube projecting into said annular flange and being located closely adjacent and immediately above said apertured crown, thereby forming an intercepting-shoulder between which and said apertured crown the air and gas can uninterruptedly pass, substantially as and for the purposes herein described.

2. The combination in an incandescent gas-burner, of an inverted substantial conical tube of gradually-increasing diameter, a burner-tip consisting of a sieve-like diaphragm located over the top of said conical tube from which depends a ring, as 9, surrounding the said tube, a mantle surrounding and surmounting said burner-tip and ring, the stud 12 secured to the ring 9, a rod 14 secured to the stud and supporting the mantle, an initial mixing device comprising a dome-shaped and apertured chamber laterally contracted at its apex, an inlet-nozzle having a multiplicity of apertures located beneath the apex of the dome and admitting gas to said chamber, air-ports opening into said chamber, a short annular flange extending upwardly from the contracted section of said chamber and formed integrally therewith said flange-interiorly diverging outwardly at an angle coincident with the outer surface of said conical tube, the lower end of said conical tube fitting snugly in and extending a short distance within said short tube or nipple immediately above and closely adjacent said apertures thereby forming a shoulder intercepting the admission of gas and air into said conical tube between which and said apertures there is no intercepting medium, substantially as described.

3. An improved burner for producing incandescent gas-light, comprising an upwardly-diverging hollow cone surmounted by another upwardly-diverging hollow cone, both cones forming a tube of gradually-increasing diameter, the lower cone having walls of a greater angle than the upper cone, the lower end of the lower cone being of lesser diameter than the upper portion, the top of the upper cone being of greater diameter than any other portion of the two cones, substantially as described.

4. In an incandescent gas-burner, the combination with an initial gas and air mixing chamber provided with an annular lip or nipple, of an upwardly-diverging hollow cone surmounted by another upwardly-diverging hollow cone, the two cones forming a tube of gradually-increasing diameter, the lower cone having walls of a greater angle than the upper cone, a burner-tip surmounting the upper portion of said combined tube, and the lower or smallest end of said tube extending into said annular nipple forming an intercepting-shoulder to the admission of gas and air into said tube, substantially as described.

Signed in the city, county, and State of New York this 30th day of July, 1897.

LEE T. ALTON.

Witnesses:
B. S. WISE,
WM. JACOBSON.